June 2, 1931.     A. STENGER     1,807,801
PINNING CLAMP
Filed Sept. 16, 1929
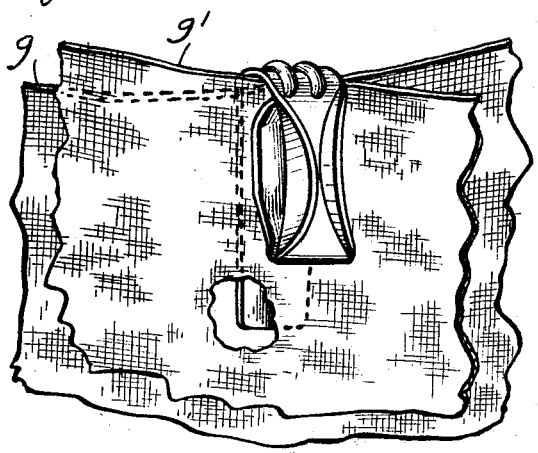
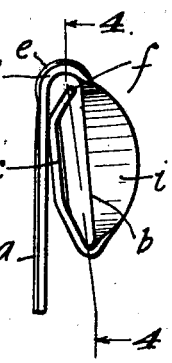
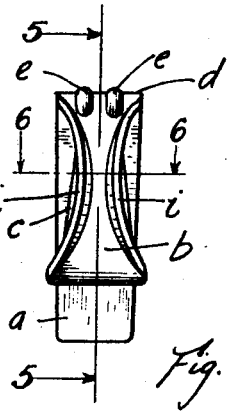
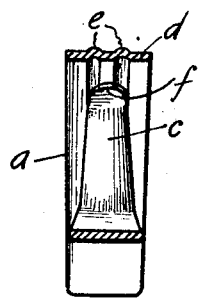
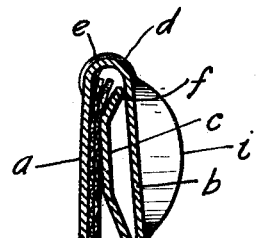
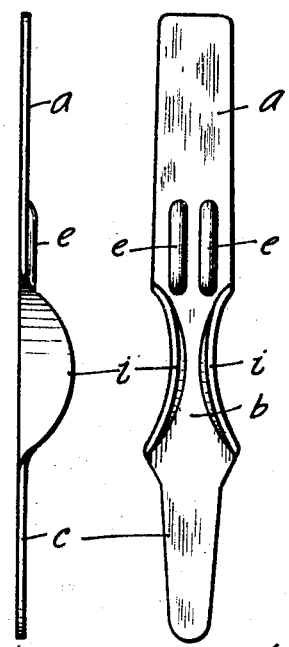
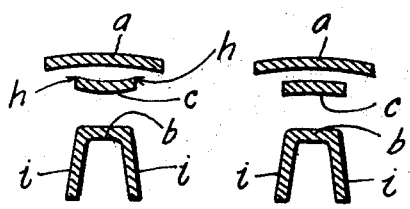
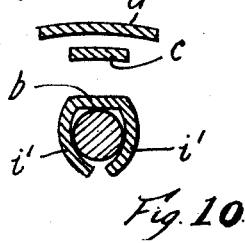
Inventor
Albert Stenger
by T. J. Geisler
Attorney Patented June 2, 1931

1,807,801

UNITED STATES PATENT OFFICE

ALBERT STENGER, OF PORTLAND, OREGON

PINNING CLAMP

Application filed September 16, 1929. Serial No. 392,843.

The object of my invention is to provide a barber's pin by which two pieces or ends of cloth—for example, the haircloth of a barber's shop—may be fastened together by a device not comprising a pin to be stuck through cloth, but instead to have its elements so arranged as to fasten the cloth sections together by a clamping action; hence I term my article a pinning clamp.

A further object of my invention is to provide such a pinning clamp which is not only efficient, but which is adapted to remain in serviceable condition for a long time notwithstanding continual use.

A further object of my device is to arrange the clamping elements so that there will be no tendency to cut the cloth pinned together.

A still further object of my invention is to provide an article that is relatively inexpensive to make; also, to make my pinning clamp easy to use.

Besides the use above mentioned, my pinning clamp, by a slight modification thereof, may also be used as a holder for a flower, or decoration, to be worn on the lapel of a coat, or on a garment.

I attain the object of my invention in a pinning clamp comprising an elongate U-shaped body preferably having one of its legs longer and thus projecting beyond the other, the shorter leg having an extension bent under and arranged between the legs and adapted to bear with clamping force on the other leg. The extremity of said extension is arranged relatively close to the under face of the leg of which said extension is a part to prevent the material pinned together from becoming lapped around said extremity and the sides of the leg having said extension are provided with upstanding ribs of substantial height providing a finger hold.

The further details of my pinning clamp are hereinafter fully described with reference to the accompanying drawings.

In the drawings:

Fig. 1 illustrates one use and application of my pinning clamp;

Fig. 2 is a side elevation of my pinning clamp;

Fig. 3 is a plan view thereof looking at my pinning clamp as shown by Fig. 1;

Fig. 4 is a section on the line 4—4 of Fig. 2;

Fig. 5 is a section on the line 5—5 of Fig. 3;

Fig. 6 is a section on the line 6—6 of Fig. 3;

Fig. 7 is a similar section to Fig. 6, but illustrates a slight and preferred modification of my clamping pin;

Figs. 8 and 9 represent blanks in the process of being formed into my clamping pin; and Figs. 10 and 11 illustrate modifications of the finger portion of my clamping pin, by which the latter is adapted to constitute a socket for holding a flower or decoration to be fastened on a garment.

My pinning clamp consists of an elongate U-shaped body comprising legs $a$ and $b$, with the leg $a$ preferably projecting beyond the companion leg. The leg $b$ is provided with an extension $c$, bent under and arranged between the legs so as to bear with clamping force on the leg $a$. The curved section $d$ of the body is preferably provided with stiffening ribs $e$, $e$. The extremity $f$ of said extension $c$ is so arranged, with respect to the under face of the leg of which it is a part, that when my pinning clamp is applied, as shown by Figs. 1 and 5, for clamping two sections of the cloth $g$, $g'$ together, said extremity will be brought close to the said underside, in order in that way to prevent the ends of the cloth pinned together being inadvertently lapped about such extremity; in which case it would be very difficult to remove the clamping pin in unfastenng the cloth; indeed, frequently the only way under such circumstances the clamping pin may be removed is by pulling the same along the edges of the cloth pinned together.

In order to facilitate the clamping action by which my clamping pin functions, I prefer to curve both the leg $a$ and the extension $c$, transversely. Such curving may be done as illustrated in Fig. 6, the leg $a$ and the extension $c$ being oppositely curved; or, if it is believed that such arrangement tends to present more or less sharp cloth cutting edges as $h$, the curving of said members may be done to be concentric as illustrated by Fig. 7.

In order to facilitate the work of applying my pinning clamp to the cloth sections to be fastened together I provide the leg c thereof with upstanding ribs i, i, on its opposite longitudinal edges, the ribs being made of substantial height so as to function as a finger hold. Incidentally, these ribs serve to stiffen the upper leg b; and preferably I curve said ribs i, i, inwardly since that also facilitates the taking hold of my pinning clamp and applying the same to fasten section of cloth together.

My pinning clamp is conveniently made from a blank as illustrated by Figs. 8 and 9.

By forming the said ribs i, i of the leg b in cross section as illustrated by i' in Fig. 10, my pinning clamp is adapted to be used for holding a flower, or other ornamentation, to be fastened to the lapel of a coat, or to a garment, such use being illustrated by Fig. 11.

I claim:

1. A pinning clamp comprising an elongate, U-shaped body, one leg of said body projecting beyond the other, the other leg having an inturned extension adapted to bear with clamping force on the inner surface of the other leg, thereby to hold the material clamped between the said legs firmly but without tearing or cutting, the extremity of said inturned extension being turned upwardly toward the inner surface of the shorter leg, whereby to prevent the material clamped therebetween from becoming lapped around the said extremity.

2. In a pinning clamp comprising an elongate U-shaped body, one leg of which projects beyond the other and is slightly convexed transversely outwardly, the other leg having an inturned extension adapted to bear with clamping force on said longer leg, thereby to hold the material clamped firmly between said legs, said inturned extension being also slightly convexed transversely outwardly to prevent tearing or cutting of the material.

3. In a pinning clamp comprising an elongate U-shaped body, one leg of which projects beyond the other, the other leg having an inturned extension adapted to bear with clamping force on said longer leg thereby to hold the material clamped firmly between said legs, the said inturned extension being arranged at an angle with the said longer leg to provide a greater space at the initial end of the opening between the legs.

4. In a pinning clamp comprising an elongate, U-shaped body, one leg of which projects beyond the other, the other leg having an intured extension adapted to bear with clamping force on said longer leg thereby to hold the material clamped firmly between said legs, the said inturned extension being arranged at an angle with the said longer leg to provide a greater space at the initial end of the opening between the legs, and the initial end of the inturned extension receding to further increase the opening at said initial end.

5. In a pinning clamp comprising an elongate, U-shaped body, one leg of which projects beyond the other, the other leg having an inturned extension adapted to bear with clamping force on said longer leg thereby to hold the material clamped firmly between said legs, the sides of the shorter leg being turned outwardly to provide a finger hold.

6. In a pinning clamp comprising an elongate, U-shaped body, one leg of which projects beyond the other, the other leg having an inturned extension adapted to bear with clamping force on said longer leg thereby to hold the material clamped firmly between said legs, the sides of the shorter leg being turned outwardly and oppositely concaved at the middle to provide a combined finger hold and socket.

7. A pinning clamp comprising an elongate, U-shaped body, one leg of which projects beyond the other and is slightly convexed transversely, outwardly, the other leg having an inturned extension adapted to bear with clamping force on said longer leg thereby to hold the material clamped firmly between said legs, said inturned extension being also slightly convexed transversely outwardly to prevent tearing or cutting of the material, the said inturned extension being arranged at an angle with the said longer leg to provide a greater space at the initial end of the opening between the legs, and the initial end of the inturned extension receding to further increase the opening at said initial end, the sides of the shorter leg being turned outwardly to provide a finger hold, the extremity of said inturned extension being turned toward the inner surface of the shorter leg, whereby to prevent the material therebetween from becoming lapped around the said extremity.

ALBERT STENGER.